UNITED STATES PATENT OFFICE.

ZENUS CORBIN AND GIDEON MARLETT, OF SYRACUSE, NEW YORK.

ARTIFICIAL HONEY.

Specification forming part of Letters Patent No. 17,264, dated May 12, 1857.

*To all whom it may concern:*

Be it known that we, ZENUS CORBIN and GIDEON MARLETT, of Syracuse, in the county of Onondaga and State of New York, have invented a new composition of matter which we term "Artificial Honey;" and we do hereby declare that the following is a full and exact description thereof.

Our artificial honey is composed of four pounds of sugar, one pint and a half of water, five grains of rosin, or its equivalent antiseptic, two drams of butter, or other pure eatable oil, one and a half dram of cream of tartar, two drams gum-arabic or gum-senegal, one and a quarter pound of honey, eight drops essence peppermint, and one dram isinglass. These ingredients are combined with each other in the following manner, viz: The sugar and water are incorporated with each other and raised to a boiling-temperature. Then the butter and rosin are melted together and thoroughly incorporated with the sirup formed by the union of the sugar and water. Then boil the aforesaid mixture for the space of ten minutes, or thereabout. Then add thereto the gum-arabic and the isinglass in a mucilaginous state, and the cream of tartar, and boil the said increased mixture for the space of ten minutes, or thereabout. Then add the honey to the mixture, and after boiling the same for the space of five minutes, or thereabout, remove from the fire, and when nearly cold add the essence of peppermint and thoroughly incorporate it with the entire mass, when the mixture will present the appearance of pure honey, and will have nearly the same flavor.

Our artificial honey is as palatable as pure honey, and is a much healthier article of diet. It makes an excellent substitute for honey, sugar-house molasses, sirups, and preserves.

What we claim as our invention, and desire to secure by Letters Patent, as a new product or composition of matter, is—

Our artificial honey, composed of the within-enumerated ingredients, or their equivalents, combined with each other, substantially in the manner herein set forth.

ZENUS CORBIN.
GIDEON MARLETT.

Witnesses:
JOHN DUMFORD,
GEORGE W. DEAN.